May 22, 1945.  F. W. BRAENDEL ET AL  2,376,654
ART OF MAKING GROOVED PINS AND THE LIKE
Filed Sept. 24, 1941  7 Sheets-Sheet 1

INVENTORS
Felix W. Braendel
Cecil C. Richards
BY
Dean Fairbank & Hirsch
ATTORNEYS

May 22, 1945.　　F. W. BRAENDEL ET AL　　2,376,654
ART OF MAKING GROOVED PINS AND THE LIKE
Filed Sept. 24, 1941　　7 Sheets-Sheet 5

INVENTORS
*Felix W. Braendel*
*Cecil C. Richards*
BY
*Dean Fairbank & Hirsch*
ATTORNEYS May 22, 1945. F. W. BRAENDEL ET AL 2,376,654
ART OF MAKING GROOVED PINS AND THE LIKE
Filed Sept. 24, 1941 7 Sheets-Sheet 7

INVENTORS
Felix W. Braendel
Cecil C. Richards
BY
Dean Fairbank & Hirsch
ATTORNEYS Patented May 22, 1945

2,376,654

UNITED STATES PATENT OFFICE 2,376,654

ART OF MAKING GROOVED PINS AND THE LIKE

Felix W. Braendel, Union City, and Cecil Charles Richards, West New York, N. J., assignors to Groov-Pin Corporation, Union City, N. J., a corporation of New York Application September 24, 1941, Serial No. 412,132

45 Claims. (Cl. 29—34)

The present invention relates to automatic machinery for the quantity production of machined pieces by a sequence of steps that include some inherently fast and at least one inherently slow machining operation, and the specific application shown in the drawings relates to the manufacture of longitudinally grooved and end milled fastening pins or rods, widely known as Groov-Pins.

Among the objects of the invention are to provide a fully automatic machine by which machinable stock may be accurately sheared off, die formed and milled to desired specifications, and more particularly by which pins of desired length may be neatly end milled and accurately grooved at rapid rate from stock of uniform cross-section, preferably from wire of suitable gauge, the rate of production of which machine is substantially as fast as the die forming or grooving step, without retardation by the inherently slower milling operation, so that the output is at least twice that of machines heretofore in use for the purpose, and the cost of production of the metal pieces is greatly reduced.

Another object is to provide a rugged machine of the above type which is compact, which functions with a minimum number of operating parts, none of which is delicate or apt to become out of order, and the cost of upkeep of which is low.

Another object is to provide a machine of the above type, which admits of ready adjustment or setting for the fabrication of pieces of different lengths, diameters, contour and cross-sectional conformation.

The machine of the invention attains the desired speedy output by including two or more of the slowly operating milling equipments which operate on a corresponding number of the pieces to be machined, and conjointly have an output as fast as the shearing, die forming or other inherently fast operating elements of the machine, the machine affording automatic means for routing the metal pieces selectively to the plurality of slowly operating equipments to or from the other metal working parts.

In the more specific application of the invention, lengths cut from a single wire feed are longitudinally grooved by passing successively through a single grooving die, but the machine has two or more end milling equipments to which it selectively routs the pins, successive pins passing to the end milling equipments in sequence, so that each such equipment operates upon only every second, third or fourth pin as the case may be, and the several end milling equipments conjointly have an output sufficient to accommodate the inherently rapid output of the single grooving die, cut off and wire feed.

In general, it is preferred to perform the grooving before the end milling operation, although the reverse order of precedure is within the scope of the invention from its broader aspects. Ordinarily it is sufficient to provide two end milling equipments disposed laterally of the grooving die discharge and to provide a pair of movable, desirably of slidable carriers, each of which shuttles between the grooving die discharge, where it picks up a pin, to the corresponding end milling equipment where the carrier becomes locked and the pin locked to the carrier which thus acts as a chuck during the end milling operation.

Desirably, each end milling equipment involves a pair of opposed milling heads, and is constantly driven from a separate motor. Means is provided to cause the opposed milling heads to move toward each other into milling engagement with the ends of the interposed pin after the same has been securely clamped in its chuck, and to recede therefrom after the end milling operation has been completed.

Another feature of the invention is the means for automatically shearing the wire into pin lengths prior to the end milling operation, and for performing the grooving or other inherently fast operation thereon. In a preferred embodiment, the said means comprises a ratchet feed for intermittently advancing the wire in steps of predetermined lengths corresponding to the pin lengths to be sheared off, a shearing cutter coacting with a die beyond which the measured pin length protrudes for severing such length and a gripper arm or lever which coacts with the shearing cutter for grasping the severed length and shifting it laterally into alignment with a feed tube which in turn is aligned with the intake of the substantially conventional grooving die. The feed through the tube to the grooving die is effected by a reciprocating plunger moved forward after each fresh length of pin is fed into alignment therewith, thereby to feed the pin from the tube through the grooving die, while discharging the previously grooved pin from said die to the transfer carriage and thereby incidentally discharging the previously completely machined pin from said transfer carriage.

The various operations of the preferred machine embodying the present invention including the wire feed, the wire shearing and gripping, the pin feed, the grooving, the controlled operation of the carriages that transfer the pins and serve as chucks therefor in end milling position and the movements of the end milling heads are all effected by cam feeds in properly timed relation, driven from a common motor under the bed of the machine.

In the accompanying drawings in which is shown one of various possible embodiments of the several features of the invention as incorporated in an automatic machine for making grooved pins:

Fig. 14 is a view in transverse cross-section, and on a larger scale, taken on line 14—14 of Fig. 1, Fig. 21 is a side elevation of one form of grooved pin made by the present machine, Fig. 22 is a transverse sectional view taken on the line 22—22 of Fig. 21, and Figs. 23, 24, 25 and 26 are alternative forms of grooved pins that may be made by the machine of the present invention.

Figures 14, 21, 22, 23, 25:
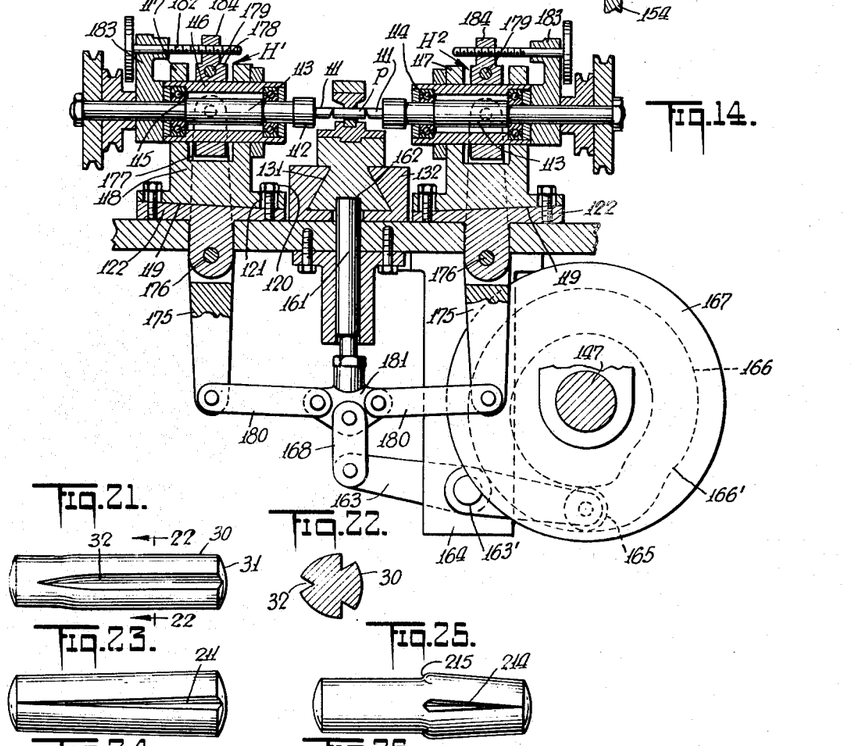

The machine shown in the drawings converts wire from an appropriate reel (not shown) into grooved pins, of which one is illustratively shown in Figs. 21 and 22. That pin comprises a generally cylindrical metal rod 30 rounded at its ends as at 31 and having a plurality of grooves 32 extending longitudinally thereof.

The various wire feeding, cutting, grooving and milling operations are performed by mechanisms for the purpose, all mounted upon the bed 33 of the machine. Illustratively, these mechanisms may include wire straighteners S at the inlet of the machine, a wire feed F, a wire shearing cutter C, a grooving die G, end milling equipments $M_1$ and $M_2$ laterally of the grooving die discharge and reciprocating transfer carriers $T_1$ and $T_2$ for shifting the grooved pin from the grooving die discharge for registry with the end milling equipments. The various feed elements are driven in timed relation from cam shafts under the bed 33, all driven by a common motor M.

Each of the elements of the machine will now be described in detail.

*The wire feed mechanism*

The wire straightener S comprises a pair of conventional blocks 35 and 36, one vertical, the other horizontal, each with a series of rollers 37 thereon, between which the wire $w$ is fed to straighten out loops or possible kinks therein. The wire passes on from the wire straightener past a stationary block 38 between a pair of grooved friction wire driving rollers 39 and 40 and thence it passes through a die 41 in a die block 42 to abutment against adjustable gauge stop 43 aligned therewith and which determines the length of wire to be cut off from beyond said die.

Figures 3, 4, 5:
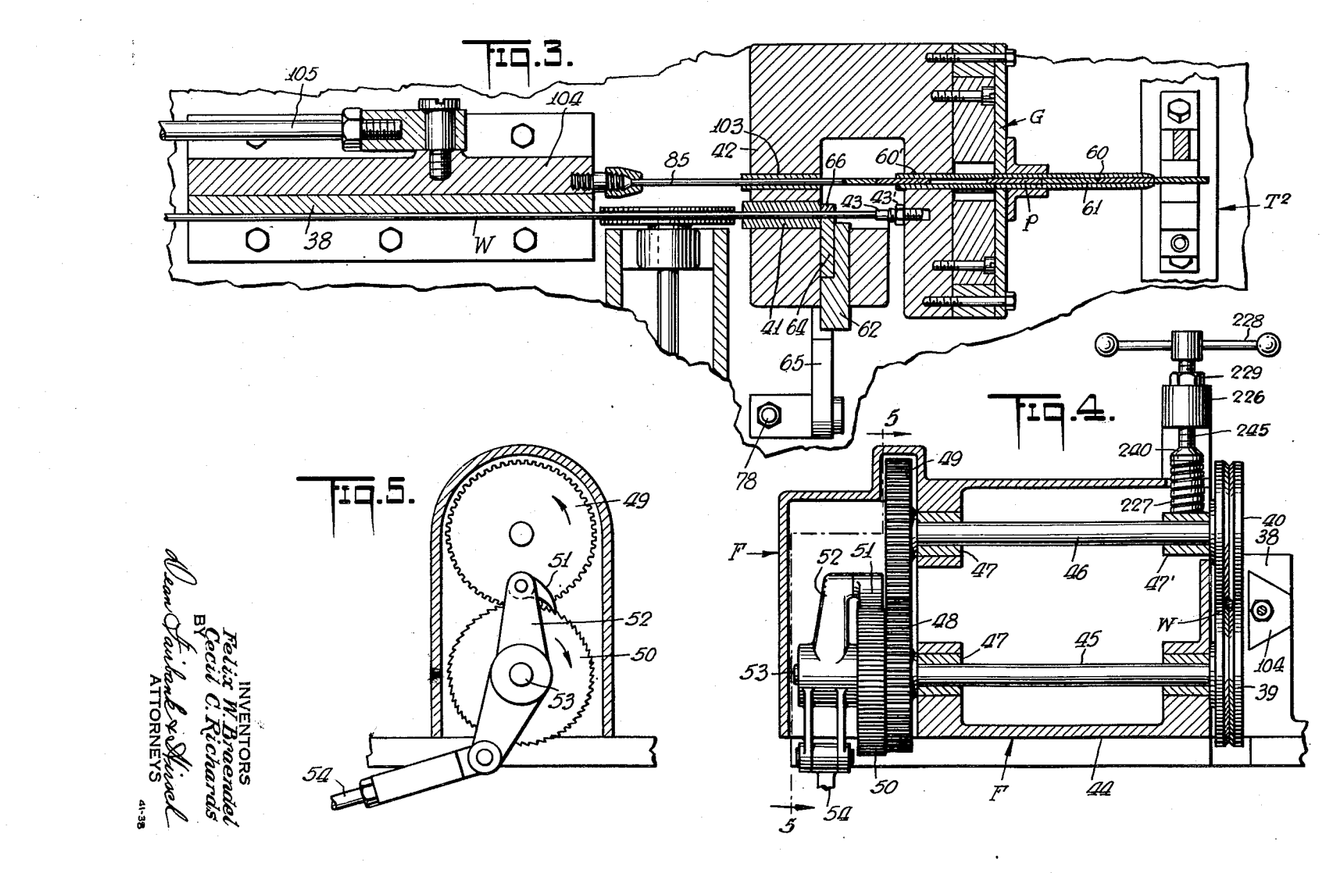
Fig. 3 is a view in longitudinal cross-section on a larger scale taken on line 3—3 of Fig. 2.
Fig. 4 is a view in longitudinal cross-section on a larger scale, taken on line 4—4 of Fig. 1, showing the ratchet wire feed.
Fig. 5 is a view in transverse cross-section taken on line 5—5 of Fig. 4.

An intermittent feed mechanism causes intermittent rotation of the friction driving rollers 39 and 40 for step-by-step advance of the wire to abut against gauge stop 43 after each successive wire length has been severed and has been laterally displaced, all as set forth hereinafter. The intermittent wire feed mechanism comprises a box 44 carrying parallel drive shafts 45 and 46 mounted in corresponding bearings 47 and carrying the respective coacting friction drive wheels 39 and 40 exposed at one end thereof. Meshing gears 48 and 49 are affixed to the other end of the respective shafts 45 and 46. Concentric and rigid with gear 48 is a ratchet wheel 50 driven in a step-by-step movement by a pawl 51 upon the upper end of a lever 52 pivoted at 53 upon the shaft 45 and operated from a connecting link or pitman 54 pivoted to the lower end of said lever 52 and driven from slide block 55 in a corresponding track on the face of a plate 56. Plate 56 is rotatably adjustable upon rotatable holder plate 57 for which purpose it has arcuate slots 58 through which extend the clamping bolts 58'. Plate 57 is affixed to the end of shaft 59 under the bed 33. The position of adjustment of plate 56 determines the length of stroke of rod 54 to set the machine for the pin length desired.

*The shearing mechanism*

Figures 6, 8:
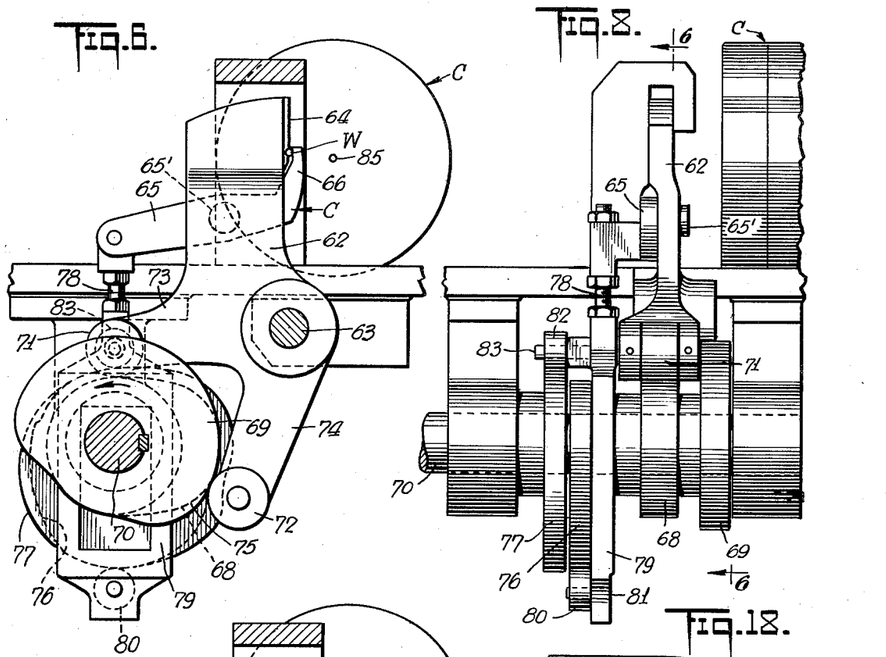
Fig. 6 is a front elevation with parts in section showing the wire cutter and gripper taken on line 6—6 of Figs. 1 and 8.
Fig. 8 is a side elevation of the construction shown in Fig. 6.

The length of pin intercepted between the die face 51 and the stop gauge 43 is sheared off by a knife construction best shown in Figs. 6, 7 and 8, which also shifts the severed pin length or blank laterally into alignment with pin feed tube 60' and through which such severed pins $p$ are successively advanced by a mechanism to be described hereinafter.

The shearing mechanism comprises an upstanding lever 62 pivoted to the bed of the machine as at 63 and having a cutting conformation 64 near its upper end. The said lever has pivoted thereto a smaller holding or gripping lever 65 with an inturned gripping finger 66 which retains the severed pin $p$ against the shearing lever 62 in the transfer of the pin to the pin feed tube 60'.

Desirably, the shearing and gripping levers are positively operated both in the shearing and displacing operation, and in the release and return operation. For this purpose, a pair of cams 68 and 69 mounted upon cam shaft 70 coact respectively with rollers 71 and 72 mounted on the ends of a pair of arms 73 and 74 respectively, on the lower end of the shearing lever 62. Roller 71 rides on cam 68 which is conformed as best shown in Fig. 6 with a sharp increase of radius at 75 to cause the lever 62 to rock quickly but smoothly in a clockwise direction to perform the shearing and shifting operation from the position shown in Fig. 6 to that shown in Fig. 7.

The cam roller 72 rides laterally upon the return cam 69 for the shearing lever 62 as shown. Said return cam 69 is desirably devoid of any sharp change of radius. The return of shearing lever 62 after a shearing and pin transfer operation may therefore be accomplished in a steady nearly uniform stroke.

The gripping lever 65 pivoted at 65' to the shearing lever is set and held in gripping relation by cam 76 and is released and held released by a cam 77, both said cams being also driven from cam shaft 70. Gripping lever 65 has an adjustable rigid rod connection 78 to a rectangular yoke 79 encompassing the cam shaft 70. A roller 80 upon a pin 81 through the lower end of the yoke 79 coacts with the lower edge of cam 76 while a roller 82 upon pin 83 through the upper end of yoke 79 rides over the top edge of cam 77. Accordingly, in operation, the cam 76 will be effective to transmit tension by way of roller 80 through yoke 79 and rod 78 to cause the arm 65 to rock counterclockwise in Fig. 6 and to grip the pin just prior to the shearing operation. Roller 82 as it subsequently rides over the enlargement of cam 77 will raise the lower end of gripping lever 65 to rock its gripping jaw in clockwise direction away from the shearing lever 62 as the severed pin 67 is about to be pushed forward into tube 60'.

The gripping lever cams 76 and 77 are so shaped relative to the shearing lever controlling cams 68 and 69 that the gripping lever 65 will be quickly but smoothly depressed to cause the gripping engagement to occur as the shearing operation is about to take place. Throughout the movement of the shearing and gripping lever combination from the position of Fig. 6 to that of Fig. 7, no relative movement beween the shearing and the gripping lever occurs, the operating cams 68 and 76 actuating said elements having coordinating contours for that part of the movement. Accordingly, the severed pin is maintained in its gripped relation until it comes into alignment with the pin feed tube 60'.

The gripping lever release cam 77 is so formed that when the pin feed plunger 85 to be described hereinafter, engages the pin $p$ that had just been shifted laterally, the gripping lever 65 is released with respect to the cutting lever 62 by pivoting slightly in clockwise direction about its mount 65'. In the return of shearing lever 65 from the position of Fig. 7 to that of Fig. 6, it moves past the end of die 41 with the gripping lever 65 still in open position clearing the pin feed plunger 85, and a moment later after a fresh pin length $p$ has been advanced across the die face 41 against the stop 43, the cam 76 again becomes operative to cause lever 65 to grip the advance end of the wire stock and to hold it preparatory to the shearing operation as above set forth.

*The grooving die and the associated pin feed mechanism*

Figures 9, 10, 11:
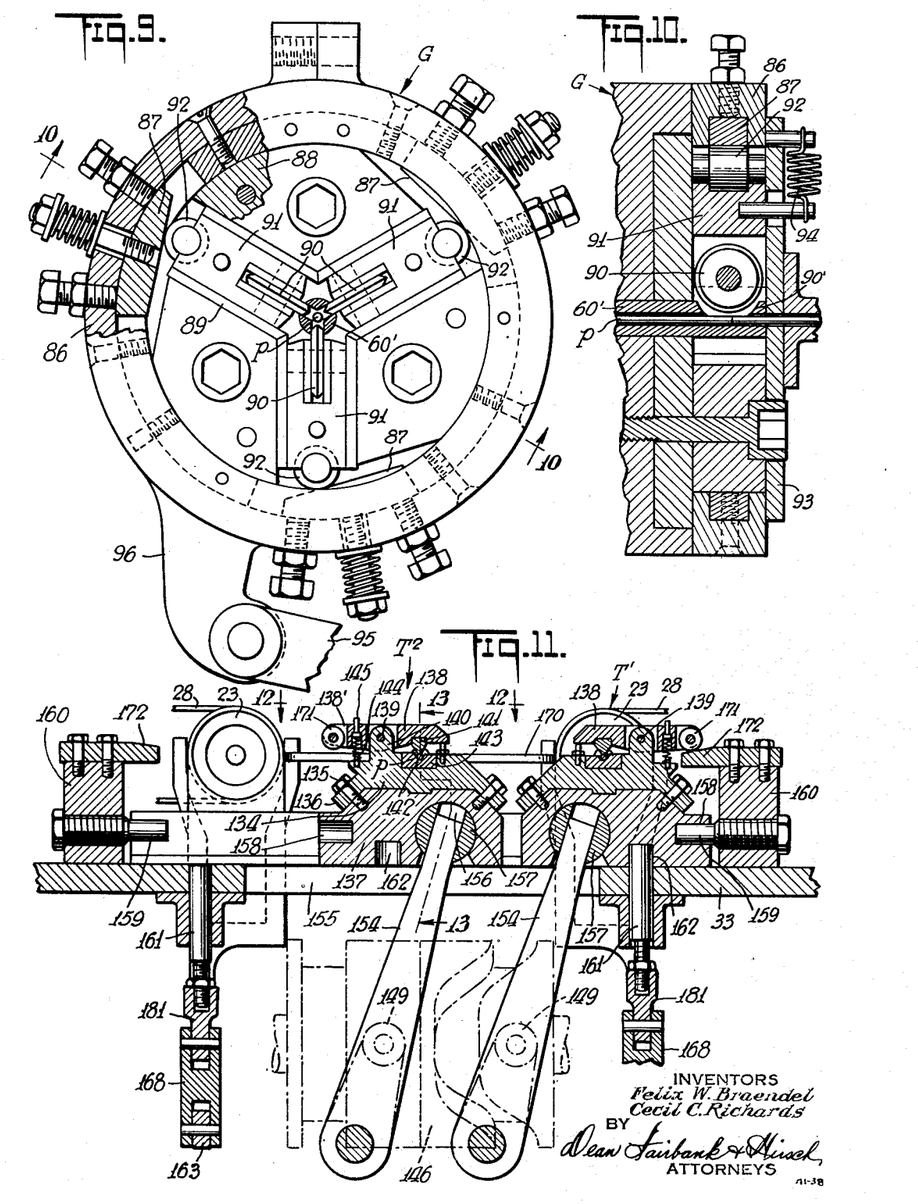
Fig. 9 is a transverse sectional view on a larger scale of the grooving die, taken on line 9—9 of Fig. 1.
Fig. 10 is a transverse sectional view taken on line 10—10 of Fig. 9.
Fig. 11 is a fragmentary view in transverse cross-section, and on a larger scale, taken on line 11—11 of Fig. 1.
Figure 12:
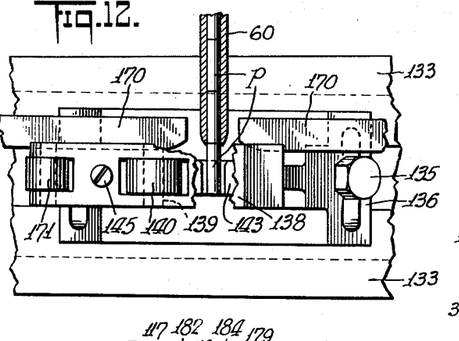
Fig. 12 is a plan view with parts in section taken on line 12—12 of Fig. 11, and on a larger scale.
Figure 13:
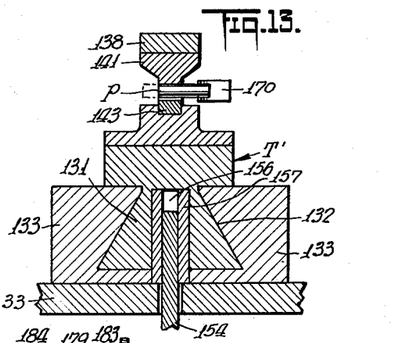
Fig. 13 is a fragmentary transverse sectional view on a larger scale taken on line 13—13 of Fig. 11.

The grooving die G, llustratively shown in Figs. 9 and 10 is itself of more or less conventional construction which need be but briefly described. It comprises a movable outer drum 86, with cam faces 87 affixed to the inner periphery thereof, and a fixed inner drum 88 with radiating fixed hollow cylinder arms 89 therein housing the grooving die elements, each illustratively comprising a beveled roller 90 at the inner end of a corresponding piston 91, equipped at its outer end with a roller 92 to ride over the associated cam surface 87 of the outer drum. A face plate 93 retains the die carrying assemblage in place and coil springs 94 urge the various die carrying pistons outward against the respective cams 88.

When the outer drum 86 is rocked in clockwise direction (Fig. 9) the rollers 92 riding over cam faces 87 cause the plungers 91 to move inward toward the axially directed pin stock $p$ so that the beveled dies 90 will roll the desired grooves, into the pin as the latter is being pushed through the grooving die. Desirably the pin feed tube 60 protrudes into the grooving die for centering the pin therein. The extension has slots 90' to permit the grooving rollers to extend therethrough and engage the pin within said extension.

Figure 17:
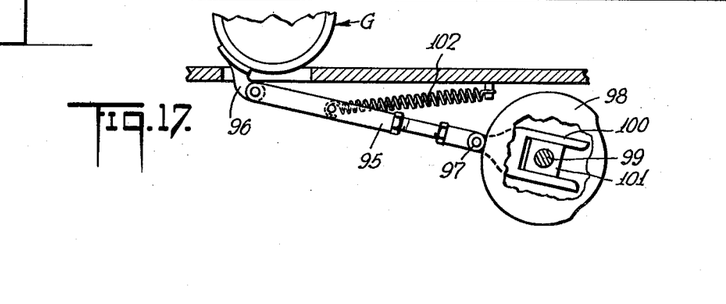
Fig. 17 is a fragmentary side elevation of the grooving die operating mechanism taken on line 17—17 of Fig. 15.

The grooving die is desirably operated from a pitman 95 (Fig. 17), pivoted to a bracket 96 unitary with the outer drum 86 and having a roller 97 riding over the edge of a cam 98 driven from cam shaft 99. The end of the pitman 95 has a yoke 100 straddling a square block 101 rotatably positioned upon the end of the cam shaft 99 to permit outward movement of the pitman against the resistance of coil spring 102, to accommodate the movement of the roller 97 as the cam rides therealong.

The pin feed tube 60' is aligned with the inlet of the grooving die G and the severed pins are successively fed thereto by plunger 85, extending through bushing 103 in the die block 42. The plunger 85 is reciprocated by a slide piece 104 in the block 38 to which is pivoted a pitman 105, the opposite end of which performs a crank movement by being pivoted at 106 near the periphery of a plate 107 on the end of a shaft 108 mounted in bearings 109 upon the bed 33 of the machine. Shaft 108 is driven by gear 110' extending through a corresponding slot in bed 33 and meshing with gear 110 upon shaft 59. The stroke of plunger 85 is adjustable by means similar to that shown at 55, 56, 57 and 58 for adjusting the wire feed stroke.

*The end milling mechanism*

As previously indicated, the end milling operation is inherently more time consuming than the wire shearing or the grooving operation. Therefore, were the machine provided with but a single end milling equipment, the same would constitute a bottle neck retarding the inherently fast cutting and grooving operations to the slower rate of end milling.

For most purposes, as in the embodiment shown, it is sufficient to provide two sets of end milling equipments and selectively to rout the successive pins alternately thereto. In the particular embodiment shown, the duplicated end miller equipments $M_1$ and $M_2$ are disposed upon the bed 33 at opposite sides of the grooving die G. Each end miller equipment preferably comprises a pair of opposed end miller heads $H_1$ and H₂ between which the pin p is to be positioned for concurrent milling of the two ends thereof. Each milling tool 111 is retained in a chuck 112 on the end of a shaft 113 lodged in ball bearings 114 abutting shoulders 15 on the shaft and enclosed in a cylindrical shell 116. The shell 116 is slidably supported in the arms 117 of a base 118 the inclined lower face 119 of which is affixed by screws 120 through elongated slots 121 to a correspondingly inclined bed plate 122. By this mount slight adjustments in the setting of the milling heads is permitted.

The opposed miller tools 111 of each end milling equipment are preferably driven in opposite direction to balance displacing torque upon the pin being end milled. To that end the driving motor 125 for the end miller has a suitable reversing mechanism 24 at one end for reverse drive of the corresponding motor driven shaft 26. The opposed end millers are belt driven, belt 27 connecting pulley 20 on the directly driven end of the motor to pulley 21 on the corresponding end miller. Pulley 22 on the reverse motor driven shaft 26 similarly drives pulley 23 on the companion end miller through belt 28.

To effect proper tightening of the belts the motor 125 is preferably mounted upon a plate 126 secured on the machine bed 33 by means of bolts 29. The bolt slots are elongated as at 29' to permit minor adjustment of motor plate 126 to tighten belt 27 to desired tension.

Figures 7, 18, 19:
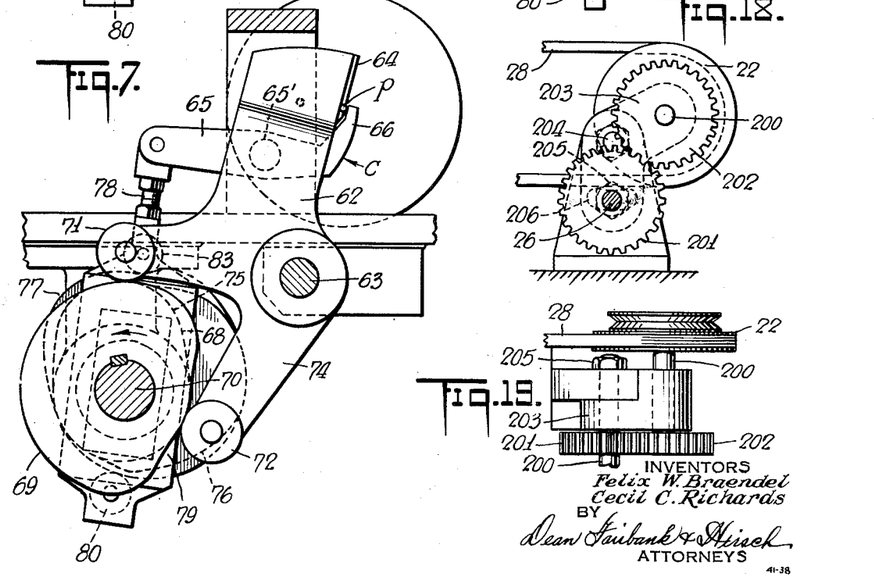
Fig. 7 is a view similar to Fig. 6 showing the position of the cutter and gripper in shifting the severed pin.
Fig. 18 is a fragmentary detailed view taken on line 18—18 of Fig. 1.
Fig. 19 is a plan view of the construction of Fig. 18.

To assure appropriate tightening of the companion belt 28 which is driven through the reversing mechanism, the arrangement shown in Figs. 18 and 19 is resorted to. To this end the motor driven shaft 26 mounts a gear 201 meshing with a gear 202, rigid and coaxial with pulley 22. Gear 202 and its pulley are mounted upon one end of a bell-crank lever 203 mounted on a fixed pivot 204 at its mid point. The bell-crank lever may be moved about its pivot 204 to shift the corresponding pulley 22, thereby tightening belt 28. For this purpose the other arm of bell-crank lever 203 has an elongated slot 206 to move past the fixed shaft 26 and by tightening nut 205 the pulley becomes fixed in belt tightening position. Preferably, each shaft has one or more additional pairs of pulleys 130 to permit driving the milling heads at various speeds depending on the metal being milled.

To transport or rout the grooved pins as they emerge from the discharge tube 60 of the grooving die, alternately to the right and to the left, the transfer carriers T₁ and T₂ are keyed as at 131 in a corresponding keyway 132 on fixed bed block 133 and are arranged to be reciprocated from position of registry with the grooving die discharge 60 to bring the grooved pin to alignment between the opposed end milling tools 111. Each transfer carrier comprises a body 134 affixed as for instance by screws 135 through laterally inclined flanges 136 embracing the top of the base block 137 of said carrier, which is keyed to the bed as previously set forth, and in the embodiment shown is thus a slidable carriage. The carriage has a pin gripping jaw in the form of a lever 138 pivoted at its middle as at 139 in ears 140 rising from the top of the body 134 and bearing a hardened clamping die 141 to retain the pin p in a corresponding groove 142 in the hardened face plate 143 of the body. A coil spring 144 between the base 134 and a screw stop 145 in the heel of the lever 138 urges the lever resiliently to grip the pin p.

Figure 16:
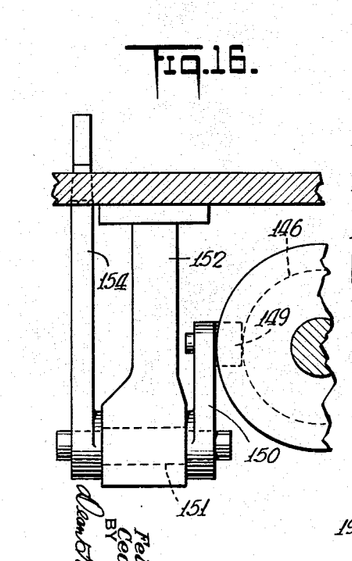
Fig. 16 is a fragmentary sectional view taken on line 16—16 of Fig. 15.

The reciprocation of the transfer carrier is effected by a cam 146 upon cam shaft 147. Desirably, the cam is of the drum type with a peripheral camming groove 148 in which rides the roller end 149 of the lever 150, affixed at one end of an axle 151 mounted in fixed hanger 152 (Fig. 16). The carriage transfer lever 154 is rigidly affixed upon the other end of axle 151 and extends upwardly through a corresponding slot 155 in the bed into a corresponding transverse port 156 within a cylindrical bearing piece 157 lodged in a corresponding cylindrical bore in the transfer carriage base 137.

The construction of the two carriages T₁ and T₂ and their respective controls are identical, but the corresponding cams 146 are so timed with respect to each other, that each carriage moves from pin receiving to milling position and back, during the progress of the milling operation upon the pin in the companion carriage.

It is of course important that the transfer carrier be securely locked in position during the end milling operation and likewise that the pin being milled be securely gripped therein in order to assure accurate end milling. To this end each transfer carriage desirably has a short horizontal bore 158 in its outer face which telescopes over a corresponding cylindrical pin 159 in the side of stop piece 160 upon the bed.

Moreover, an upright latch bolt 161 is provided to enter a short upright bore 162 through the bottom of the carriage base 137. This bolt is thrown by a suitable cam controlled transmission from its idle position, substantially flush with the bed of the machine, as shown at the left in Fig. 11, to the latching position shown at the right. To that end a lever 163 pivoted upon a bracket 164 is operated from its roller end 165 by the cam groove 166 in a face cam 167 upon cam shaft 147. The opposite end of said lever 163 through link 168 raises and lowers the plunger 161 to bolt the carriage in position as shown in Fig. 14 when it reaches end milling position and keeps it bolted there throughout the end milling operation. Subsequently the low portion 166' of the cam effects withdrawal of said bolt 161 and release of the carriage to permit its return by the action of drum cam 146.

The pin pushed out of the grooving die, discharge tube 60 is first taken up between the die plate 143 and the gripping jaw 138 and in the outward movement of the transfer carriage its rear end is engaged by curved fixed guide rail 170 which pushes the pin forward to centered position in the pin holder of the transfer carriage.

Securely to lock the pin to the transfer carriage during the end milling operation, the heel 138' of the gripping jaw 138 is provided with a roller 171 which rides up on the inclined face of a plate 172 upon stop piece 160, and thereby forces the gripping jaw 138 tightly upon the pin p to grip the latter securely and maintain it gripped during the end milling operation.

The milling cutting tools 111 are normally spaced apart by a distance slightly greater than the length of the pin, so that the same may be readily interposed therebetween at the end of the transfer carriage stroke. After the transfer carriage has been bolted in end milling position and the pin to be milled has been securely chucked in place, the end milling cutters 111 are moved toward the interposed pin to effect such end milling. For this purpose, the bearing shells 116 carrying the two opposed end milling shafts 113 are caused to move longitudinally toward each other. While a separate cam control may be utilized for this purpose, a desirable construction is shown in which the same face cam 167 by which the transfer carriage latching bolt 161 is operated, performs also the milling tool advancing operation. For this purpose, each end milling head H₁ and H₂ has a generally vertical lever 175 pivoted at 176 to the milling head base 122 and has a pivotal yoke connection 177 to a collar 178 clamped by cross bolt 179 about bearing shell 116. The lower ends of the companion levers 175 of the opposed end miller heads are connected by generally horizontal links 180 to the wings of a yoke piece 181 affixed to the lower end of the bolt 161, and the mid portion of said yoke is connected by the short link 168 to the end of lever 163.

Timing control

Figure 15:
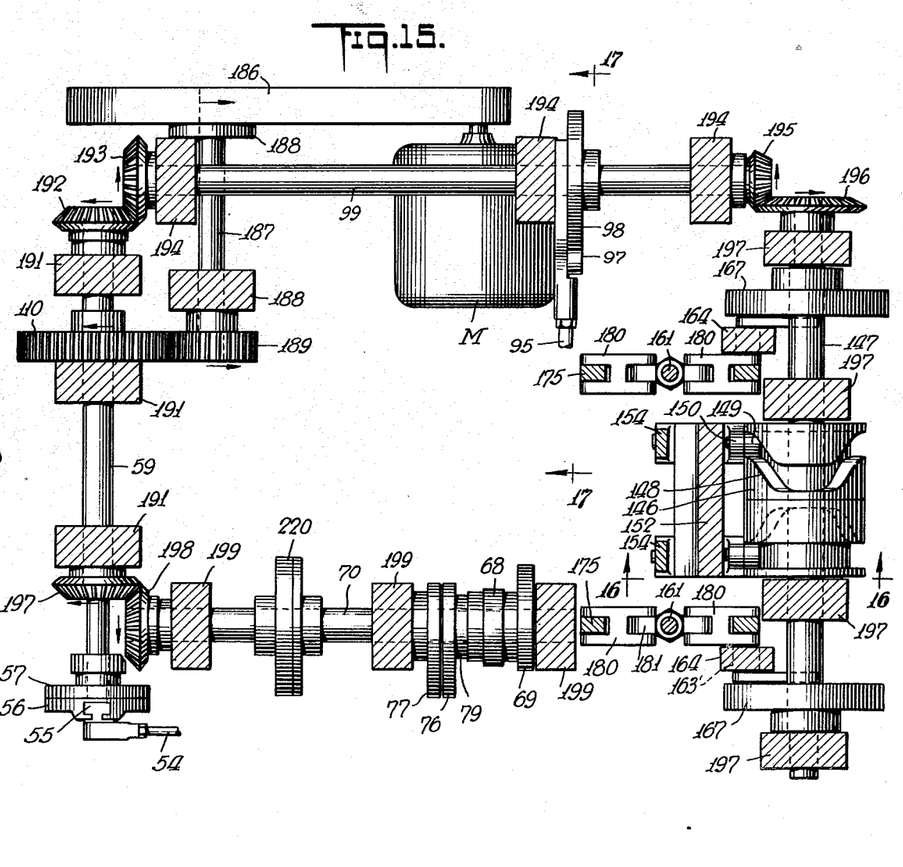
Fig. 15 is a view in longitudinal cross-section taken on line 15—15 of Fig. 2.

While the various cams for operating the constituent elements of the machine may be arranged in timed relation in any of a multiplicity of possible ways, to be driven from a common motor M, desirably under the bed of the machine, a particularly desirable arrangement is shown in Fig. 15. The motor M has a belt connection 186 to a short transverse main drive shaft 187 mounted in bearings 188. This drive shaft carries gear 189, which drives companion gear 110 on transverse shaft 59 mounted in bearings 191. The outer end of shaft 59 desirably carries the drive crank plate 56 for operating the ratchet feed pitman 54 as previously set forth. The transverse shaft 59 is connected by a miter gear pair 192 and 193 to a longitudinal cam shaft 99 operating in bearings 194 and said shaft desirably mounts the cam 98 for operating the grooving die pitman 95. The opposite end of longitudinal cam shaft 99 is drivingly connected by a miter gear pair 195 and 196 to a transverse cam shaft 147 mounted in bearings 197. Said transverse cam shaft 147 carries the pair of cam drums 146 which control the reciprocatory motion of the end miller transfer carriages, and also carries the face cams 167 that control the motion of the latching bolts 161 for the transfer carriages when in end milling position as well as the longitudinal approach of the end milling heads, as shown in Fig. 14. By miter gear pair 197 and 198 the transverse shaft 59 is also connected in driving relation to longitudinal shaft 70 extending between bearings 199. Upon shaft 70 are mounted the cams 68 and 69 that control the motion of the wire shearing lever 62 and the associated cams 76 and 77 that control the motion of the wire gripping lever 65.

The various cams thus neatly arranged in compact relation under the bed of the machine may be timed in conventional ways, timing disks 220 upon shaft 70 being useful for such settings.

Product and adjustments therefor

A few illustrative examples of numerous products alternative to that of Figs. 21 and 22 previously described that may be made by the machine are shown in the drawings and will now be described.

In the embodiment of Fig. 23 the grooves 211 taper off from a maximum width and depth at one end to substantially a zero width and depth at the other end and the metal displacement in the formation of such grooves results in proportional increase in diameter, so that the pin flares from the end at which no grooving is effected to a maximum diameter at the end of maximum width and depth of grooving.

Figure 24:
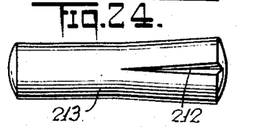

The embodiment of Fig. 24 is produced by the use of a grooving cam of shorter action which makes grooves 212 tapering from maximum width and depth at one end to a minimum width at the mid-portion of the pin, so that the pin is cylindrical as at 213 for half of its length, and flares along the opposite half to a maximum diameter at its extremity.

In the embodiment of Fig. 25, the grooves 214 are shown flaring from a minimum at one end of the pin to a maximum width at the mid-section of the pin. The displacement of the metal in the formation thus results in flaring the otherwise cylindrical surface of the pin outward from the main diameter at the end, to the maximum diameter corresponding to the maximum width and depth of groove at the middle, and therefore resulting in the shoulder 215 at the region of the inner ends of the grooves.

Figure 26:
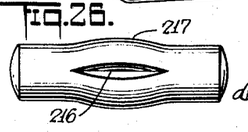

In the embodiment of Fig. 26 the grooves 216 are spaced from both ends of the pin and extend along the mid-section of the pin, said grooves being widest at their mid-sections and tapering off to a minimum width at their ends. As a consequence, the otherwise cylindrical surface of the rod is bowed outward at 217 to a maximum along its mid-section, tapering off toward the region of the ends of the grooves down to the cylindrical contour of the end sections of the pin.

As is understood by those skilled in the art, appropriate rotary beveled dies 90 would produce the pins of Figs. 21 to 24, while non-rotary wedging dies would be employed for making the pins of Figs. 25 and 26, and such non-rotary dies could be used if desired, for the other embodiments as well.

The character and dimensions of the product are determined by the adjustment or setting of the machine.

The diameter of the product and the corresponding diameter of the wire stock used may be selected at will. The only adjustment required to adapt the machine to any particular diameter of rod or pin is to appropriately space the wire driving rollers 39 and 40 to accommodate wire of selected diameter therebetween. To this end bearing 41' adjacent grooved roller 40 is floatingly arranged and the roller 40 is resiliently pressed down by a threaded rod 225 threaded into a block 226 adjusted by cross bar 228 and locked by lock nut 229 resiliently to transmit thrust through a heavy coil spring 227 resting against said bearing 41'.

The number, length, width and shape or conformation of the grooves is determined by the number and contour of the grooving members 90 of the grooving die. The length of pin or wire desired is determined by the position of gauge stop 43 which is adjustable by nut 43' as well as the setting of slotted plate 56. The distance between milling cutters 111 is also adjustable for ready accommodation therebetween of the length of pin to be produced. To this end, collar 178 is adjustable along bearing shell 116. For this purpose a screw 182 through lug 183 on the bearing shell is threaded into eye 184 on collar 178. Discharge tube 60 is removable for ready installation of one accommodating an integral number of pins of selected length without protrusion. The position in which guide rails 170 are fixed is adjustable to increase or decrease the distance of said rails from the center line of the carriers T₁ and T₂. To this end each of said rails is desirably integral with a forwardly projecting rod 210 slidably positioned in a block, pivotally displaceable about stud 211, to which it is clamped by a binding screw (not shown). The rod 210 is clamped in its position of adjustment by screw 212. Thus, the guide rails 170 are readily set to determine the positioning of the pins to be centrally gripped by the carrier.

*Operation*

The operation may be briefly summarized as follows: The machine is threaded up by leading wire $w$ from an appropriate reel (not shown) through the wire straightener S and passing it between the feed rollers 39 and 40 and through die 41 for its extremity to contact stop gauge 43, whereupon the motors M and 125 are started.

Figures 1, 20:
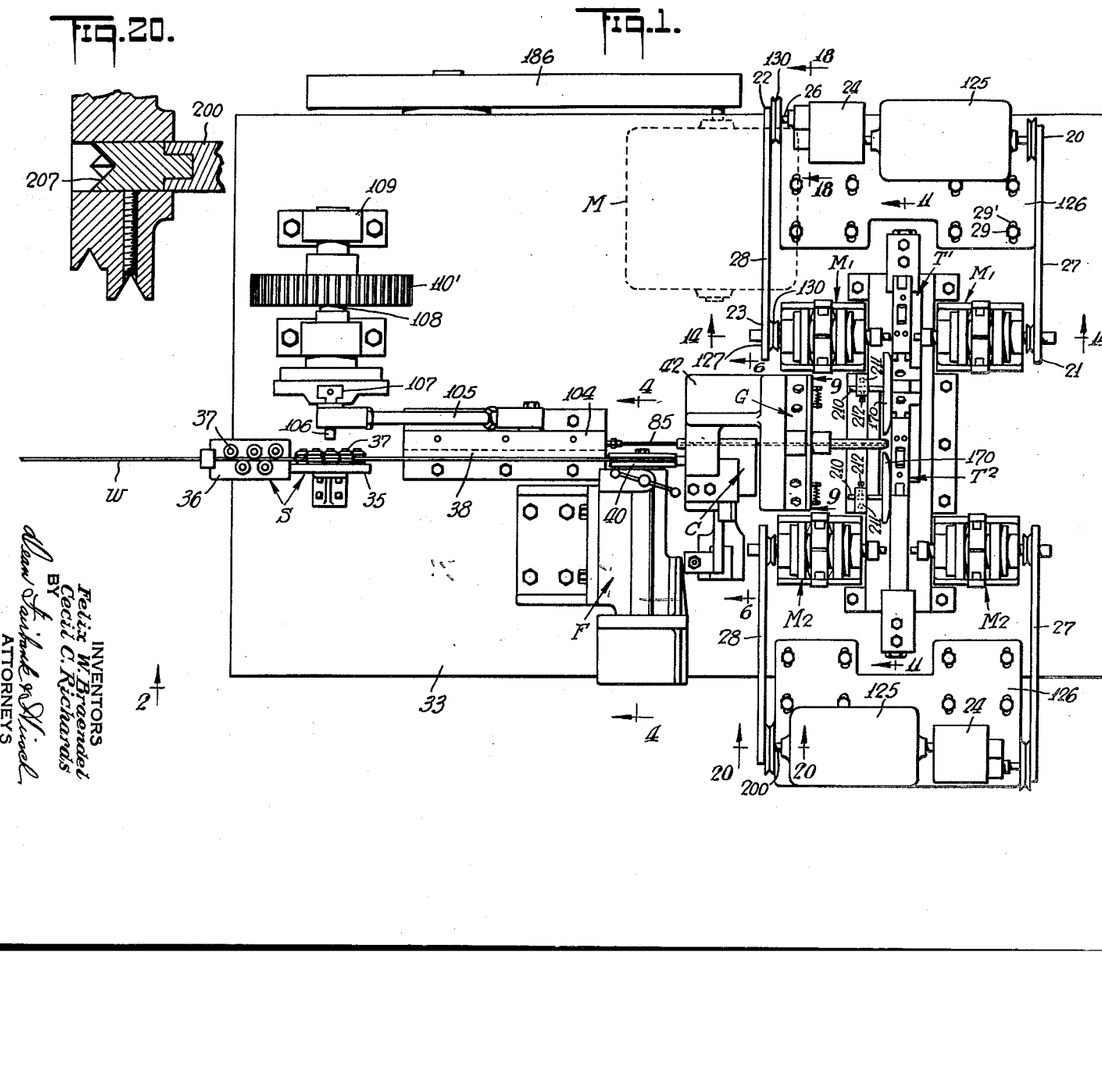
Fig. 1 is a plan view of the machine.
Fig. 20 is a fragmentary detailed view on a larger scale taken on line 20—20 of Fig. 1.
Figure 2:
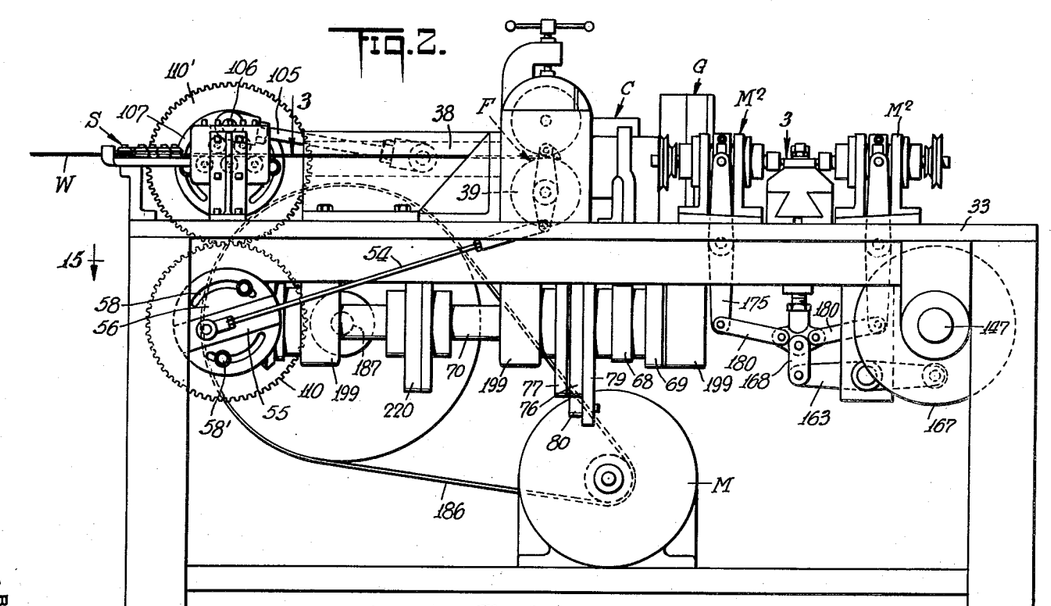
Fig. 2 is a view in longitudinal cross-section taken on line 2—2 of Fig. 1.

As a convenience the end shaft 200 of one of the motors 125 may be provided with a countersunk end milling cutter 207 therein as shown in Fig. 20, for readily rounding, chamfering or removing the burr from one end of a fresh coil of wire preparatory to feeding it into the machine, thereby to facilitate and speed up the threading operation.

In operation, the wire feed F driven from shaft 59 through crank disk 56 and link 54 steps the ratchet wheel 50 forward and through gears 48 and 49, drives the rollers 39 and 40, intermittently to advance the wire to contact the end gauge 43 at the end of each advance. The parts are arranged for overfeed by rollers 39 and 40 which slip over the wire when its end reaches stop gauge 43, so that the full advance of wire is assured.

The cams on cam shaft 70 are so disposed that the operating cam 68 will now lift collar 71 to shift shearing lever 62 laterally to shear off the end of wire intervening between die plate 41 and stop gauge 43. At the beginning of this operation roller 71 of shearing lever 62 depresses yoke 79 to cause gripping lever 65 to pivot about its mount 65' against lever 62 for its finger 66 to press the wire $w$ against the shearing lever 62. The cam 68 effects a continued movement of the shearing lever 62 with its associated gripping lever 65 toward the right in Fig. 6, to carry the severed pin length into registry between the pin feed tube 60' and the plunger 85.

The reciprocating slide block 104 mounting the plunger 85 is now caused to advance by the operation of its crank connection 107, at the end of shaft 108 which is driven by the gear 110 on shaft 59 which meshes with gear 110' on said shaft 108.

As soon as the pin due to the plunger movement, has partly entered the pin guide, release cam 77 comes into operation to raise roller 82 and disengage the gripping lever 65 from the severed pin $p$ to permit the plunger 85 in its continued operation to push said pin completely into the pin guide tube 60', and thereupon promptly to return the plunger 85 to the left of the die plate 41. While this is occurring, the continued movement of cam 69 pivots the arm 74 about its pivot 63 to the left or in counter-clockwise direction, and with it, the open gripping lever 65, preparatory to gripping and shearing the next length of wire, after the latter has been positioned in place against gauge stop 43.

At each advance of the plunger 85 the severed pin length within the pin feed tube 60' is advanced into the grooving die G. As the pin is advancing through said grooving die, cam 98 on longitudinal cam shaft 99 causes the rocking of the outer drum 86 of said grooving die to effect the grooving action in manner well understood, whereupon as the cam 98 completes its turn, coil spring 102 returns the outer casing 86 to position preparatory to taking up another pin length to be grooved.

In the advance of the plunger 85, not only is a fresh pin length fed into the grooving die, but a previously grooved pin is ejected therefrom into the discharge tube 60 which is axially aligned with the grooving die. The foremost pin $p$ in said tube is accordingly pushed into that one of the transfer carriages T which at that instant is in registry with the end of said tube 60. The advance end of such pin $p$ therefore is pushed into place between the face plate 143 and the gripping jaw 141 on the carriage, said jaw being at that time only resiliently closed by the expansion of the spring 145.

The drum cam 146 on the cam shaft 147 functions at this stage to pivot transfer lever 154 in the bearing hanger 152 and through the cylindrical bearing connection 157 carriage T₁ is pushed to ride laterally along its keyed track 132 until the lateral bore 158 in its base 137 is passed over pin 159.

In the movement of the transfer carriage, one end of the pin $p$ rides along fixed guide rail 170, which pushes the pin inward for effective, preferably median engagement with the jaw 138.

As the carriage reaches end milling position, the pin to be end milled is automatically gripped tight as a result of the lifting movement of the roller end 171 thereof by riding upon the inclined plane 172.

After the pin thus becomes axially aligned between the milling heads and tightly gripped or held as in a chuck, face cam 167 enters into operation to push roller 165 downward and correspondingly to elevate the opposite end of lever 163. By the upward thrust transmitted through link 168 and yoke 181, plunger 161 is raised to pass its upper end into bore 162 in the carriage base 137. In this operation, yoke 181 pushes links 180 outward to spread the lower ends of the lateral links 175 apart about their pivots 176, thereby to cause the end milling bearing shells 116 and their shafts 113 to approach, for their tools 111 to engage the ends of the interposed pin $p$ and to maintain such engagement while the end milling operation proceeds. The end milling tools being constantly driven by motor 125, the end milling occurs as the milling heads are thus moved toward each other.

After the end milling operation has been completed the face cam 167 in its continued rotation retracts the end miller shafts to release the ends of the end milled pins and retracts bolt 161 to unlock the carriage. The drum cam 146 in its continued rotation now causes the control transfer lever 154 to slide the carriage T₁ back, for alignment of the completed pin with the discharge tube 60 of the grooving die. At that stage, the pin feed plunger 85 causes the introduction of another pin through tube 60', into the grooving die and simultaneous expulsion of the previously grooved pin from the grooving die and entry thereof into the pin discharge tube 60 and the concurrent feed of the foremost pin from said discharge tube onto that transfer carriage then aligned therewith. In that latter operation, the pin pushes out of the carriage, the previously end milled pin, which drops along an appropriate discharge chute (not shown) into a container for the finished product. The two drum cams are so coordinated and timed that the two transfer carriages pick up alternate pins from the grooving die discharge tube 60. Each transfer carriage moves from end milling position to pick-up position in alignment with the grooving die and back to end milling position while the other transfer carriage remains in fixed and locked position and its pin is being end milled.

While the specific structure shown in the drawings and the particular operation set forth have been found to be highly practical for reliably turning out large quantities of grooved pins, it will be understood that numerous variations of the machine structure and of the product made thereby are within the scope of the invention as claimed.

It will be understood that while the machine includes two pairs of milling or miller-heads, which ordinarily are sufficient to accommodate the output of the grooving die, the invention could be embodied in a machine having three, four or more milling equipments.

While throughout the specification the invention is described as applicable to the fabrication of grooved pins from metal wire, it will be understood that it is applicable likewise to the preparation of similar units from tubular wire stock, and that the cross-section of the solid or tubular stock may be polygonal, oval, or of any shape required for the particular purpose in hand.

It will also be understood that the invention is not limited to the manufacture of metal units, but is applicable to the fabrication of pieces from any machinable stock of substantially uniform cross-section such, for instance, as rods or tubes of plastic.

It will also be apparent that the invention is not limited in its applicability to units serving as fasteners such, for instance, as those shown in Figs. 21–26, but that such units may be prepared for other purposes.

The machine in the embodiment disclosed has an output, depending upon the character of stock worked upon, of from 100 to 180 pins per minute, which is at least twice as great as the most efficient machine for the general purpose now known to applicants. The cost of upkeep of the machine is low, both for supervision and repair. Accordingly, the machine effects a drastic reduction in the cost of production of its output.

As many changes could be made in the above mechanism and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent is:

1. A machine for fabricating grooved products from stock of uniform cross-section, which comprises a feed therefor, means for shearing the same into successive pin lengths, means for thereupon longitudinally grooving said pin lengths, means for gripping the grooved pin lengths successively, means for simultaneously milling both ends of the individual gripped pin lengths and timed drive means by which said operations are initiated in sequence.

2. A grooved pin manufacturing machine, comprising a wire feed, means for advancing said feed in steps corresponding to the length of the pin to be formed, means operating after each step for severing the desired length of wire, a grooving die, means for feeding the severed lengths of wire through said die, means for operating the die to perform the grooving operation, a pair of end millers and means for successively gripping grooved pins discharged from said grooving die, and for interposing such gripped pins successively between said end millers for performing the end milling operation thereon.

3. A machine for automatically fabricating grooved pins, comprising a bed, a sequence of mechanisms upon said bed including a step-by-step wire feeder, a wire cutter, a grooving die, pin feed means for pushing the severed wires in sequence through the grooving die, a pair of aligned end miller heads having milling tools, means for interposing the grooved pins discharged from said grooving die between the end miller heads, means for axially shifting said end miller heads toward each other to bring the tools thereof into operative engagement with said pins, a common motor, timed cam controls driven therefrom for operating all of said means in sequence and a separate motor for continuously driving said end milling tools.

4. An automatic grooved pin making machine comprising a bed, an intermittent wire feed for advancing said wire in steps corresponding to the length of the pin to be formed, means for successively severing pin lengths from the advance end of the wire, pin feed mechanism laterally of said wire feed, means for releasably grasping and laterally displacing the pins successively into alignment with said pin feed mechanism, means for intermittently operating said latter mechanism for successively advancing the severed pins, a grooving die aligned with said pin feed mechanism, means for releasably gripping the grooved pins as they emerge from the grooving die, a pair of aligned end miller heads, means for interposing the gripped pins successively between said end miller heads, and means for moving said heads toward each other for operative engagement with the ends of the intervening pins.

5. An automatic machine for manufacturing grooved pins, comprising a bed, a wire feed thereon including means for intermittently stepping a length of wire forward, means for cutting off from the advance end of the wire predetermined lengths of pins, a pin feed tube laterally of said wire feed, means for gripping the severed pin and shifting the same laterally into alignment with the feed tube, a grooving die axially aligned with said pin feed tube, means for intermittently pushing the pin lengths through said feed tube into said grooving die, means for actuating the grooving die to indent the pins and in the step-by-step advance, discharging the grooved pins from the grooving die, means for thereupon grasping and rigidly retaining the successive grooved pins, a cam shaft structure under the bed operated from a common source of power for actuating the several means in timed relation and means for end milling said pins while they are being rigidly retained.

6. A grooved pin manufacturing machine including a grooving die, means for feeding a sequence of pin lengths through said die and for operating said die upon each length while lodged therein, a plurality of end miller equipments, means for discharging the pins successively from the grooving die and means for routing the discharged pins in a regular sequence of paths for end milling of each pin by one of the end miller equipments.

7. In a grooved pin manufacturing machine a grooving die, a plurality of pairs of end milling heads, means for feeding a sequence of pin lengths through said die, means for discharging the pins successively from the grooving die and means for routing the discharged pins in a regular sequence of paths to interpose each pin between one pair of milling heads for milling both ends of the interposed pin simultaneously, and means for causing each said pair of heads to move toward each other in end milling.

8. A machine for manufacturing end milled grooved pins at substantially the speed at which the grooving operation may be performed, said machine comprising a plurality of relatively slowly operating end miller pairs, a grooving die, means feeding lengths of pins in sequence therethrough, means for operating said grooving die upon said lengths in sequence, means for routing the grooved pins from said grooving die selectively and interposing the same between the respective end miller pairs in a regular sequence, means for continuously driving said end miller pairs, and means for axially shifting said end miller pairs relative to the respective interposed pins for effecting the end milling operation by the continuously rotating tools of said end miller pairs.

9. A machine for manufacturing end milled grooved pins at substantially the speed at which the grooving operation may be performed, said machine comprising two relatively slowly operating end miller pairs, a single grooving die assemblage which performs the grooving operation successively upon all of the pins, means for automatically routing the pins from the common grooving die alternately between the respective end miller pairs and means for securing each pin in axial alignment between the constituent elements of the end miller pair throughout end milling operation.

10. In a machine for manufacturing end milled grooved pins at substantially the speed at which the grooving operation is performed, said machine including a plurality of relatively slowly operating end miller pairs, a grooving die, means for feeding lengths of pins in sequence thereto, means for operating said grooving die upon said lengths in sequence, means for routing the grooved pins from said grooving die selectively to the respective end miller pairs in a regular sequence, a common motor drive, a timed transmission therefrom for causing feed of the pins, operation of the grooving die, routing of the grooved pins and setting thereof with respect to the end miller pairs and a separate source of power for continuously driving the end miller pairs.

11. In an automatic machine for performing a sequence of machining operations including an inherently fast operation and a relatively slower milling operation, said machine having equipment for performing the inherently fast operation and having a plurality of milling equipments for operating conjointly at substantially the rate of the fast operating equipment, and means for routing the work in regular sequence between the first equipment and the milling equipments, said means comprising a plurality of movable carriers each travelling between an associated milling equipment and the fast operating equipment common to all of said milling equipments.

12. In an automatic machine for performing a sequence of machining operations including an inherently fast operation and a relatively slower milling operation, said machine having equipment for performing the inherently fast operation and having a plurality of milling equipments for operating conjointly at substantially the rate of the fast operating equipment, and means for routing the work in regular sequence from the fast operating equipment to the successive milling equipments, one to each of the milling equipments in order, said routing means comprising movable carriers reciprocating between the respective milling equipments and the outlet of the fast operating equipment, and means for automatically locking the work of each carrier and locking each carrier in position while the milling operation is being performed and releasing said lock upon completion thereof.

13. A machine for manufacturing end milled metal pins from a length of wire, said machine comprising an intermittent wire feed, means for shearing off a pin blank after each wire feed operation, means for thereupon simultaneously milling both ends of the pin blank, said latter means comprising a plurality of fixed end miller devices, each miller device comprising a pair of end millers to mill both ends of a pin blank, and a corresponding number of reciprocating carriers, means for feeding the sheared off pins to the carriers in sequence, and individual means for moving each carrier from a blank receiving position outwardly to a milling position, said latter means being coordinated whereby one carrier is located at its milling position while another carrier is located at blank receiving position.

14. A machine for manufacturing end milled metal pins from a length of wire, said machine comprising an intermittent wire feed, means for shearing off a pin blank after each wire feed operation, means for thereupon simultaneously end milling both ends of the pin blank, said latter means comprising a plurality of fixed end miller devices, each miller device comprising a pair of end millers to mill both ends of a pin blank, and a corresponding number of reciprocating carriers, means for feeding the sheared-off pins to the carriers in sequence, individual means for moving each carrier from a blank receiving position outwardly to a milling position, said latter means being coordinated whereby one carrier is located at its milling position while another carrier is located at blank receiving position, and means for locking each carrier in position, each carrier having a chuck for tightly clamping the corresponding pin thereto while the end milling of such pin takes place and releasing such lock in the return of the carrier.

15. A machine for manufacturing grooved pins from a length of wire, said machine comprising an intermittent wire feed, means for shearing off a pin length after each wire feed operation, a grooving die, means for feeding the pin lengths in sequence through said grooving die and operating said die upon each pin while the latter is lodged therein and means for end milling each grooved pin delivered from the grooving die, said latter means comprising a plurality of end miller devices and a corresponding plurality of movable carriers for selectively routing the pins in regular order to the several end miller devices.

16. A machine for manufacturing end milled metal pins from a length of wire, comprising an intermittent wire feed, means for shearing off a pin blank after each wire feed operation, means for thereupon simultaneously milling both ends of the pin blanks, said latter means comprising a plurality of fixed end miller devices, each miller device comprising a pair of millers to mill both ends of a pin blank, a corresponding number of reciprocating carriers, means for feeding the sheared-off pins to the carriers in sequence, individual means for moving each carrier from a blank receiving position outwardly to a milling position, said latter means being coordinated whereby one carrier is located at its milling position while another carrier is located at its blank receiving position and means for locking each carrier in position while at the outer extremity of its movement and tightly clamping the corresponding pin thereto during the end milling operation.

17. A machine for manufacturing grooved pins from a length of wire, said machine performing the operation of shearing the wire in predetermined lengths, longitudinally grooving the lengths of wire and end milling the same at both ends thereof, said machine including a single wire shearing apparatus, a single wire grooving die and a plurality of end milling equipments, transfer carriages shuttling between the grooving die and each of the plurality of end milling equipments for causing the relatively fast operating grooving die to accommodate the joint output of the several milling equipments and cam operating means for controlling the operation of said various shearing, grooving and end milling devices and transfer carriages in timed relation.

18. In a machine for manufacturing end milled grooved pins at substantially the speed at which the grooving operation is performed, said machine including a plurality of relatively slowly operating end miller pairs, a grooving die, means feeding lengths of pins in sequence therethrough, means for operating said grooving die upon said lengths in sequence, means for interposing successive pins between said end miller pairs in regular sequence, said means including a plurality of chucks, means for moving said chucks in sequence to the discharge of said groovi: g die, means for feeding the successive pins from said grooving die into said chucks in corresponding sequence, means for directing said chucks each in a predetermined path to interpose the pin carried thereby into registry with the corresponding end miller pair, and means thereupon advancing each end milling cutter for engagement with the corresponding end of the pin being end milled.

19. The combination recited in claim 14 in which a die is provided for grooving the pin and in which the end milled pin is automatically ejected from the chuck by the advance thereinto of a grooved pin from the grooving die when the chuck is returned to alignment with the latter.

20. A machine for manufacturing end milled grooved pins at substantially the speed at which the grooving operation may be performed, including a single grooving die having a discharge tube leading therefrom, two end miller pairs at opposite sides of the grooving die discharge, two reciprocable transfer carriers associated with the respective end miller pairs, means for moving the respective carriers between the grooving die discharge and the corresponding end miller pairs, each of said carriers having a base and a spring closed gripping jaw, means for discharging the grooved pins from the grooving die through said discharge tube thereof into the carrier and thereby ejecting from the latter the pin previously held thereby, means for more tightly gripping each pin when in registry with the end miller pair, means for moving the end miller pair into cutting engagement with the ends of such pin, a common drive having a transmission therefrom for performing said several operations in timed sequence and separate sources of power for continuously driving said end miller pairs.

21. The combination recited in claim 17 in which the jaw of each transfer carrier is hinged and has a rearward extension riding over an upwardly inclined plane near the end of its path, which effects the tightening of said jaw about said pin while the carriage is in end milling position.

22. The combination recited in claim 17 in which means is provided in timed relation to the carrier movement for operating an upright bolt to enter a correspponding depression in the bottom of the transfer carrier, securely to bolt the same in place during end milling operation.

23. The combination recited in claim 17 in which each carrier has a horizontal end bore sliding over a fixed bolt in the path thereof and anchored thereby while in end milling position.

24. In an automatic machine for manufacturing grooved pins, the combination of an intermittent feed for a sequence of pin lengths, a grooving die connected with the discharge end of said feed, means for intermittently operating said grooving die to groove the pins as they are intermittently fed therethrough, two sets of end milling devices laterally of said grooving die, a pair of sliding carriers travelling in timed relation between the discharge of said grooving die and the respective end milling devices, each of said carriers having a pin gripping device aligned with the discharge of the grooving die in one extreme position, a horizontal fixed bolt at the other extremity of the stroke of said carrier coacting with a corresponding bore in said carrier to pass over said bolt in end milling position, a vertical bolt, means for automatically raising the latter into a corresponding bore in the face of said carrier when the latter is in end milling position, said pin gripping device including a hinged jaw havng an end extension and an inclined plane near the extremity of the carrier movement for tightening said jaw, firmly to secure the pin upon the firmly anchored carrier throughout the end milling operation.

25. In an automatic machine for performing a sequence of machining operations including an inherently fast operation and a relatively slower milling operation, said machine having two milling equipments for operating on alternate blanks to be machined, said machine including a pair of reciprocating carriers, a common supply for the blanks to be milled delivering successive blanks to the carriers alternately at one end of the travel of the latter, said pair of milling equipments being at opposite sides of the supply, separate means to reciprocate said carriers to alignment with the respective milling equipments, and means for operating the said latter means in timed relation to coordinate the movement of the carriers whereby one carrier is located at its milling position while another carrier is located at its blank receiving position.

26. The combination recited in claim 25 in which the carrier operating means comprises pivoted transfer levers connected to the respective carriers, rollers on said levers and drum cams for operating the same.

27. In an automatic machine for performing a sequence of machining operations on each of a supply of small metal pieces, and including an inherently fast operation and a relatively slower milling operation, said machine having two milling equipments for operating on alternate pieces, the rest of the machining operations being performed without duplication of machining parts, said machine including a pair of reciprocating carriages, a common supply for the pieces to be milled, delivering succesive pieces to the carriages alternately, said milling equipments being at opposite sides of the supply, means to reciprocate said carriages between the common supply and the respective milling equipments, said means comprising transfer levers pivoted at the lower ends thereof, cylindrical blocks lodged in the respective carriages, the upper ends of the respective transfer levers extending through the bottoms of the respective carriages into corresponding slots in said blocks and rollers rigid with said levers and drum cams for operating the latter to reciprocate said levers in timed relation.

28. In an automatic machine for performing a sequence of machining operations on each of a supply of small metal rods which include an inherently fast operation and a relatively slower end milling operation, said machine having two end milling equipments for operating on alternate rods, the rest of the machining operations being performed without duplication of machining parts, said machine including a pair of reciprocating carriages, a common supply for the rods to be end milled feeding into each carriage as it reaches the inner end of its reciprocating course, said pair of end milling equipments including milling heads at opposite sides of the supply, means to reciprocate said carriages from registry with the said supply to registry with the respective end miller equipments, said means comprising transfer levers connected to the respective carriages and pivoted at the lower ends thereof, rollers having mounts rigid with said levers and drum cams for operating the latter for the timed reciprocating movement of the carriages, means for locking each of the respective carriages in position when it reaches registry with the corresponding end miller equipment, means for advancing the end miller tool of said equipment into operative milling engagement with the rod being milled, said means comprising a lever hinged to said bed and to the corresponding milling head, an operating cam and a transmission from said cam to said lever to effect movement of the milling head to milling operation.

29. In an automatic machine for performing a sequence of machining operations on each of a supply of small metal rods, which includes an inherently fast operation and a relatively slower end milling operation, said machine having a bed, two end milling equipments thereon for operating on alternate rods, the rest of the machining operations being performed without duplication of machine parts, said machine including a pair of reciprocating carriages on said bed, a common supply for the units to be end milled feeding into each carriage as it reaches the inner end of the reciprocating movement thereof, said end milling equipments being at opposite sides of the supply, each of said equipments including a pair of opposed milling heads each having a milling tool, means to reciprocate said carriages for registry of the rods carried thereby, with the respective pair of opposed milling tools, said means comprising transfer levers connected to the respective carriages and pivoted at the lower ends thereof, rollers having mounts rigid with said levers and drum cams for operating the transfer levers in timed relation, means for moving the end milling tools toward each other into operative milling engagement with the rod being milled, said means comprising a pair of upright levers hinged between the ends thereof to said bed and hinged at the upper end thereof to the respective milling heads, spreader links intervening between said upright levers, a cam and a transmitting lever system between said cam and said upright levers to tilt the latter inward and thereby cause said milling heads to move toward each other for the milling operation and to return after the milling operation has been completed.

30. In an automatic machine for performing a sequence of machining operations on each of a supply of small metal rods, which operations include an inherently fast operation and a relatively slower end milling operation, said machine having a bed, rod feeding means on said bed, two end milling equipments on said bed for operating on alternate rods and disposed at opposite sides of said rod feeding means, the rest of the machining operations being performed without duplication of functional parts, said machine including a pair of transfer carriages, means to reciprocate said carriages alternately to take on rods advanced by said rod feeding means and to transfer the same to the respective end milling equipments, said rod feeding means delivering to each carriage as it reaches the inner end of the reciprocating stroke thereof, said carriage reciprocating means comprising transfer levers connected to the respective carriages and pivoted at the lower ends thereof to said bed, rollers having mounts rigid with the respective levers and drum cams for operating the latter in timed reciprocating relation, means for locking the respective carriages in position when they reach the respective milling positions and for bringing the end millers into operative milling engagement with the rod being milled, said means comprising slidable milling heads on said bed, means for sliding said end milling heads inward toward each other preparatory to said milling operation, said means comprising corresponding upright levers pivoted near the bed, a yoke between the lower ends of said levers, spreader levers intervening between said yoke and said upright levers, a cam and a transmitting lever system between said cam and said yoke to tilt said upright levers inward and thereby cause said milling heads to move toward each other for milling and to return after the milling operation has been completed, and an upright bolt connected to said yoke, the upper end thereof being adapted to enter a corresponding bore in the carriage for locking the same in position during the end milling operation.

31. In a machine of the character described a bed, a rod feed, two pairs of end millers at opposite sides of said rod feed, each end miller having a pair of opposed slidable milling heads, transfer carriages associated with the respective end miller pairs, means for sliding said carriages alternately between the rod feed and the corresponding end miller pair, a common cam shaft for operating said elements, said cam shaft having drum cams thereon, transfer levers operated therefrom and extending upward through the bed into the respective carriages for reciprocating the same, slotted cams on said shaft and transmissions operated therefrom for locking each carriage in end milling position and for sliding the end miller heads into coaction with the interposed rod, said latter transmission including upright levers pivoted to the bed and connected to the end milling heads, a yoke between said levers operated from said slotted cam and spreading levers between said yoke and said upright levers for tilting said levers inward and sliding said milling heads toward each other, said yoke having an upright bolt adapted to be projected upward into a corresponding bore in the transfer carriage when the latter is in end milling position.

32. In apparatus of the character described, a pin cutting mechanism comprising a wire feed, a die, means for intermittently advancing the wire past the die, a reciprocating knife for shearing off the protruding end of the wire, a pin feed tube laterally of said wire feed, a lever pivoted to said knife for gripping the severed wire end against said knife, means for actuating the lever to grip the wire against the knife, and actuating means for reciprocating the knife, said lever and knife actuating means being coordinated for first gripping and severing the wire and then moving the severed blank laterally for alignment with said pin feed tube and plunger means for pushing the severed pin from said gripping means into said tube.

33. In apparatus of the character described, a pin shearing mechanism comprising a die, a wire feed, means for intermittently advancing the wire past said die, a pin feed tube laterally of said wire feed, a shearing lever for cutting off the end of the wire protruding beyond the die, a gripping lever pivoted thereto for holding the severed pin against said shearing lever, means for actuating the gripping lever to grip the wire against the shearing lever, actuating means for operating the shearing lever, said gripping lever and shearing lever actuating means being coordinated for first gripping and severing the wire and then movable simultaneously to move the severed blank laterally for alignment with said feed tube, a plunger for successively pushing the severed pins into said tube, roller means carried by said shearing lever and cam operating means coacting therewith for effecting operation of the lever in the cutting, the transfer and the return movement.

34. In apparatus of the character described, a pin cutting mechanism comprising a wire feed, a die, means for intermittently advancing the wire, means for shearing off the protruding end of the wire, a pin feed tube laterally of said wire feed and means for gripping the severed wire end and shifting the same laterally, said shearing and gripping means comprising a pivoted shearing lever, a cam for effecting a cutting and transfer stroke of said lever, a gripping lever pivoted to said shearing lever and carried thereby, plunger means aligned with said pin feed tube for pushing the severed pin thereinto and a cam for moving said gripping lever relative to said cutting lever in timed relation to grip the wire end while being sheared and transferred and to release the wire end when engaged by the pin feed plunger.

35. In apparatus of the character described, a pin shearing mechanism comprising a die, a wire feed, means for intermittently advancing the wire past said die, a pin feed tube laterally of said wire feed, a shearing lever for cutting off the end of the wire protruding beyond the die, a gripping lever pivoted to said shearing lever for holding the severed pin against said shearing lever means for actuating the gripping lever to grip the wire against the shearing lever, actuating means for operating the shearing lever, said gripping lever and shearing lever actuating means being coordinated for first gripping and severing the wire and then movable simultaneously to move the severed blank laterally for alignment with said feed tube, a plunger for successively pushing the severed pins into said tube, said shearing lever having a forked lower arm, cam rollers on the two ends of said forked arm, a pair of cams coacting with the respective rollers, one for depressing the lever for cutting and transfer operation, the other for raising the lever for return movement thereof.

36. In apparatus of the character described, a pin cutting mechanism comprising a die, a wire supply, means for intermittently advancing wire from said supply past said die, a knife for cutting off the protruding end of the wire, a pin feed tube laterally of said wire supply, means coacting with said knife for gripping the severed wire to shift the same laterally for alignment with said pin feed tube, said knife comprising a lever having a forked lower arm, cam rollers on the free ends of said arm, a cam shaft, a pair of cams thereon coacting with said cam rollers, one for depressing the lever in cutting and transfer operation, the other for raising the lever to return the same, said gripping means comprising a gripping lever pivotally mounted upon said knife lever and having a yoke unitary therewith about the cam shaft, a pair of rollers, a pair of cams on the cam shaft coacting with the respective rollers, said rollers being mounted respectively on the lower and upper end of said yoke and riding over the respective cams, respectively for raising the lever to release the holding grip and for depressing the lever for gripping engagement.

37. In apparatus of the character described, a pin cutting mechanism comprising a wire supply, a die, means for intermittently advancing the wire past said die, a cutting lever for intermittently shearing off the protruding end of the wire, a pin feed tube laterally of said supply, a gripping lever pivoted upon said cutting lever for pressing the severed wire against the knife and moving in unison therewith to bring the severed wire into alignment with the pin feed tube, said cutting lever having a forked lower arm, cam rollers on the outer ends of said forked arm, a cam shaft having two pairs of cams, including a cutting lever operating cam and a cutting lever return cam, said cam rollers riding respectively upon the top of the operating cam and the side of the return cam, a gripping lever release cam and a gripping lever setting cam, said gripping lever having a yoke rigid therewith and encircling the cam shaft and rollers carried respectively by the upper and lower end of said yoke and riding respectively upon the gripper releasing cam and under the gripper tightening cam.

38. The combination recited in claim 36 in which an adjustable threaded link connects the gripping lever to the yoke.

39. A machine for manufacturing grooved pins, comprising a bed, a wire feed thereon including means for intermittently stepping the wire forward, means for intermittently cutting off the advance end of the wire stock to form pieces of predetermined length, a pin feed tube laterally of said wire feed, means for gripping the successive pins and shifting the same laterally into alignment with the pin feed tube, a grooving die axially aligned with said pin feed tube, means for successively pushing the pin lengths through said feed tube into said grooving die, means for actuating the grooving die to indent the pins and in the step-by-step advance therethrough discharging the grooved pins from the grooving die, movable means at the discharge end of the grooving die gripping the pin discharged therefrom, a pair of aligned end millers, means for displacing said movable means to bring the pin into alignment with and between said end millers, a motor for continuously driving said end millers, means for axially moving said end millers into engagement with the interposed pin, and a cam shaft structure under the bed operated from a common source of power for actuating the several means other than said motor in timed relation.

40. A grooved pin manufacturing machine, comprising a bed, a driving motor therebelow, a horizontal shaft driven therefrom, a pair of transverse shafts geared to the ends of said horizontal shaft, and a fourth shaft parallel to said horizontal shaft, all of said shafts being below said bed, control cams on the several shafts, including a wire feed cam on one of said shafts, pin cutter operating cams on a second of said shafts, a grooving die operating cam on another of said shafts and end milling carriage shift control cams on the fourth of said shafts, all of said cams being in timed relation, a wire feed on said bed, an eccentric operator therefor, a pitman connecting said feed to said eccentric, a combined wire cutter and gripper, a pin feed and a grooving die on said bed, said pin feed including a feed tube laterally of said wire feed, transmissions between the respective cams and the elements operated thereby for successively cutting and shifting each pin to the pin feed tube, a pin feed plunger above said bed, an eccentric for driving the same, a gear connection between the wire feed and said pin feed eccentric, said grooving die being in registry with said pin feed tube, said die having relatively movable parts to perform the grooving operation, a pair of end milling equipments, a pair of grooved pin transfer carriages, and linkages connecting the respective carriages to the corresponding cams to move said carriages one to the right and one to the left from the discharge of said grooving die, each of said carriages having means for grasping the pins from the grooving dies, said carriages at the respective outer ends of their displacement being aligned with said end milling equipments, and means operated from the corresponding cams for locking the carriages in end milling relation and for axially displacing the end milling tools thereof into operative relation with the pin to be end milled.

41. A grooved pin fabricating machine comprising a bed, a wire straightener thereon, a pawl and ratchet feed for intermittently advancing the wire thereon, a die plate, a stop for limiting the advance of said pin beyond said die plate, a pin feed tube laterally of said wire straightener, a knife for shearing the protruding end of wire to form a pin length, a finger coacting with said knife for holding and shifting the severed pin laterally into alignment with said pin feed tube, a slide block on said bed having a plunger for advancing the several lengths of pins in said pin feed tube, a grooving die on said bed and aligned with said tube, means for operating said grooving die to groove the pins successively as they are fed therethrough, end millers laterally and in front of said grooving die upon said bed, motors for continuously operating said end millers, a pair of sliding carriages upon said bed, movable respectively from alignment with said grooving die to the corresponding end millers, each of said carriages having means for grasping the grooved pin as it is discharged from the grooving die, and means for automatically tightening the grip of the pin as it becomes aligned with the end millers and for locking the carriage in place, and means for advancing the continuously operating end millers into engagement with the pin being milled.

42. A machine for automatically fabricating end milled pins, said machine including a wire feed, means for cutting the wire into pins of predetermined length, a plurality of end milling equipments, a corresponding plurality of reciprocating carriers, means for delivering the severed pins to said carriers at the inner end of the travel of the latter for transfer of said pins to the end milling equipments and rigid curved guide rails along the path of movement of the respective carriers for pushing the pins into centered relation upon said carriers and means effective at the outer end of the carrier movement for tightly clamping said pins with respect to the carrier and maintaining them clamped during the end milling operation thereon.

43. A grooved pin fabricating machine comprising a bed, a source of wire thereon, wire cutting means for severing the wire into pins of predetermined length, a grooving die, means for feeding the successive pins through said die, said die having a discharge tube, a pair of end milling equipments laterally of said discharge tube, a corresponding pair of transfer carriers moving between the respective end milling equipments and the discharge tube, each of said carriers having means for taking on a pin from the discharge tube as the carrier reaches the corresponding end of its movement and fixed curved guide rails along the path of movement of the respective carriers to push the pin delivered thereto from the discharge tube transversely of said carrier to center position and means operative at the end of the carrier movement securely to clamp the pin in position for end milling thereof.

44. In a machine of the character described, a pair of opposed machining heads, means for simultaneously driving the same in opposite direction, said means comprising an electric motor, separate belt drives from said motor to the respective machining heads, a reversing mechanism interposed between said motor and one of said belt drives, means to permit bodily adjustment in the position of said motor relative to said heads for tightening one of said belts and means for independently tightening the companion belt, said latter means comprising a gear on the motor driven shaft, a companion gear meshing therewith, a belt pulley rigid therewith, a bellcrank lever mounting said belt pulley at one arm thereof and having a slotted connection with respect to said motor driven shaft on the other arm thereof and means for clamping said slotted arm in position of belt tightening adjustment.

45. A machine for manufacturing end milled grooved pins comprising a grooving die, a pair of aligned end miller heads laterally of the grooving die discharge, transfer means for engaging each grooved pin and positioning it between the miller heads, each of said heads having means for automatically advancing the corresponding tools for engaging and milling the ends of the interposed pin, each of said heads also having a screw adjustment for initially positioning the tools thereof in accordance with the length of pin to be machined therebetween.

FELIX W. BRAENDEL.
CECIL CHARLES RICHARDS.